(12) United States Patent
Ishikawa et al.

(10) Patent No.: US 6,211,520 B1
(45) Date of Patent: Apr. 3, 2001

(54) INFRARED SENSOR AND INFRARED SENSOR ARRAY USING THE SAME

(75) Inventors: Tomohiro Ishikawa; Masashi Ueno, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/593,244

(22) Filed: Jun. 14, 2000

Related U.S. Application Data

(63) Continuation of application No. PCT/JP98/04709, filed on Oct. 19, 1998.

(51) Int. Cl.$^7$ .................................................. G01J 5/10
(52) U.S. Cl. .................... 250/338.1; 250/332; 250/338.4
(58) Field of Search .............................. 250/338.4, 338.1, 250/332

(56) References Cited

U.S. PATENT DOCUMENTS

| | | |
|---|---|---|
| 4,827,133 * | 5/1989 | Zierhut .............................. 250/338.4 |
| 4,948,963 | 8/1990 | Ballingall . |
| 5,286,976 | 2/1994 | Cole . |
| 5,343,034 | 8/1994 | Sato . |
| 5,650,622 | 7/1997 | Ookawa et al. . |
| 6,034,369 * | 3/2000 | Oda ................................... 250/338.1 |

FOREIGN PATENT DOCUMENTS

| | | |
|---|---|---|
| 6-34448 | 2/1994 | (JP) . |
| 7-306090 | 11/1995 | (JP) . |
| 9-89653 | 4/1997 | (JP) . |
| 9-329493 | 12/1997 | (JP) . |

* cited by examiner

*Primary Examiner*—Constantine Hannaher
(74) *Attorney, Agent, or Firm*—Leydig, Voit & Mayer, Ltd.

(57) ABSTRACT

An infrared sensor includes a first infrared sensing element separated by a dielectric layer from on a silicon substrate and thermally isolated from the substrate by a void in the dielectric layer. The sensor has a second temperature sensing element which detects the temperature of the whole sensor. The output difference between the first and second sensor elements is used as gate/source voltage of a MOSFET. The current variation of the MOSFET is read out as a discharge from a capacitor connected to the MOSFET. The noise in the sensor is suppressed, and performance is improved. An infrared sensor array includes the sensors arranged in an array.

13 Claims, 11 Drawing Sheets

INFRARED SENSOR AND INFRARED SENSOR ARRAY USING THE SAME

This application is a continuation application of PCT international application No. PCT/JP98/04709 which has an international filing date of Oct. 19, 1998 which designated the United States, the entire contents of which are incorporated by reference.

TECHNICAL FIELD

The present invention relates particularly to a signal reading circuit of an infrared sensor for sensing infrared rays. Also, it relates to an infrared sensor array having these sensors arranged in a planar array.

BACKGROUND OF THE INVENTION

In an infrared sensor, a sensing element (sensing section) absorbs infrared rays emitted from an object to raise the temperature of itself, and temperature information of the object is obtained by detecting the change in characteristics of the sensing element according to the temperature rise.

For describing an example of a conventional bolometer-type infrared sensor, a schematic perspective view of a sensing element section constituting the sensor is shown in FIG. 10. The bolometer-type infrared sensor is a kind of a heat-type infrared sensor that senses the temperature information of an object by converting the resistance change caused by the temperature rise of a resistor constituting the sensor, into electric current change, voltage change, or the like. In the Figure, the numeral 101 represents a resistor made of a material having a large rate of resistance change with temperature. A heat insulating structure 104 (void section) is formed on a silicon substrate 103 by micromachining to effectively raise the temperature of the resistor 101 and to maintain the raised temperature of the sensing element. The numeral 102 represents an electrode wiring for taking signals out from the sensing element to the outside.

As a heat-type infrared sensor, those utilizing the change in forward voltage of a semiconductor junction diode are also proposed. FIG. 11 shows a circuit diagram for describing an infrared sensor of junction diode type. The numeral 105 represents junction diodes (here, four diodes are connected), and a constant electric current flows through these diodes 105 from a constant electric current source 106. When infrared rays (IR) from an object are radiated onto the diodes 105, the forward voltage of the diodes change. Accordingly, temperature information of the object can be obtained by sensing the amount of change thereof by a signal output line 107. Since the amount of change in the forward voltage is smaller than that of a bolometer type that uses a material having a large resistance-changing rate, the junction-type sensors are inferior in sensitivity. However, the junction type sensor has an advantage in that it can be fabricated together with the signal reading circuit by using silicon IC processing. Also, the junction type sensor has an advantage that it has little instability of characteristics and little non-uniformity within a wafer surface; the bolometer type tends to have these problems. Also, the problem of low sensitivity of the junction type can be improved by connecting a plurality of diodes.

An infrared sensor array obtained by two-dimensionally arranging a plurality of the above-described heat-type infrared sensors is utilized as a solid image sensor for a dark field observation camera and others. The efficiency of an infrared sensor array is represented by a noise equivalent temperature difference (hereafter referred to as NETD). This is a ratio of the noise in signals between the sensors to the temperature sensitivity. For an improvement of NETD, the control of the noise is important as well as the enlargement of the temperature sensitivity.

The noise is generated in the sensor (or in the sensing element that constitute the sensor) and the reading circuit. By limiting an unnecessary signal band, the noise can be effectively controlled. A representative method of limiting the signal band is an integration circuit. FIG. 12 represents an example of the method in which a gate modulation circuit (a kind of integration circuits) is used for a quantum-type infrared sensor. In the Figure, the numeral 111 represents a quantum-type sensing element. When the infrared light enters, the carriers generated in the sensing element 111 are transmitted through a load resistance 112 to change the voltage of a node 113. An electric capacitor 114 has been charged to a certain voltage in advance by a reset switch 115. The change at the node 113 gives rise to change in the electric current of a MOSFET 117, thereby altering the amount of electric current that is discharged from the electric capacitor 114. Accordingly, the electric current value of the signal output line 116 after a predetermined discharging time depends on the amount of carriers generated in the sensing element 111, i.e. the amount of the incident light. The amount of change in the electric current value of the signal output line 116 is determined by the amount of voltage change in the node 113, the magnitude of the electric capacitor 114, the period, of discharging time, and the mutual conductance of the MOSFET 117. The period of time of electric discharge determines the signal band. The longer the discharge period, the more the band is limited to reduce the noise.

As described above, in a quantum-type sensor, the noise can be suppressed by using a of gate modulation circuit. However, if such a technique is applied to a heat-type sensor, as the output variation greatly varies when the temperature of the sensor changes, a problem rises that a small temperature change caused by the incident infrared rays, which is an aim of the sensing, cannot be read out.

The present invention has been made in order to solve the above-mentioned problems, and to provide a heat-type infrared sensor in which the noise controlling technique used in the quantum-type sensor can be applied. In other words, it is an object of the present invention to provide an infrared sensor wherein the output variations caused by the temperature change in the sensor can be suppressed by sensing the temperature of the whole sensor. It is another object of the present invention to provide an infrared sensor array in which such infrared sensors are arranged in a one-dimensional or two-dimensional array.

DISCLOSURE OF THE INVENTION

According to the first aspect of the present invention, an infrared sensor comprises: a first heat-type infrared sensing element section formed via a dielectric layer on a silicon substrate and having a void formed thereunder, an output voltage thereof depending on an amount of incident infrared rays; a MOSFET of which gate voltage is the output voltage of said first heat-type infrared sensing element section; a second temperature sensing element section formed via a dielectric film on said silicon substrate, an output voltage thereof being utilized as a source voltage of said MOSFET; and an electric capacitor section connected to said MOSFET. The second temperature sensing element section has no heat insulating structure, and its output is related to a temperature variation of the sensor itself. Accordingly, by using the output signal of the second temperature sensing element, it is possible to correct the output of the first heat-type infrared sensing element section which is a true sensing section of infrared rays. Thus, a high-efficient sensor with controlled noise can be obtained.

Also, in the aforementioned infrared sensor, the first heat-type infrared sensing element section preferably comprises a first diode group including a plurality of junction diodes connected with each other, and the second temperature sensing element section preferably comprises a second diode group including a plurality of junction diodes connected with each other. This makes it possible to fabricate the sensor together with a readout circuit of the sensor by means of a silicon IC process.

The number of the diodes in the first diode group is preferably different from the number of the diodes in the second diode group, so that a MOSFET of enhancement type can be used, thereby improving the degree of freedom in designing.

Alternatively, in the aforementioned infrared sensor of the first aspect of the invention, the first heat-type infrared sensing element section may comprise a first resistor, and the second temperature sensing element section may comprise a second resistor, so that a sensor having a high sensitivity can be easily obtained by using the resistor having a high temperature coefficient of resistance, thereby widening the scope of sensitivity setting.

Further, the first resistor and the second resistor preferably have the same resistance value, so that a MOSFET of depression type can be used as well, thereby improving the degree of freedom in designing.

According to the second aspect of the invention, an infrared sensor comprises: a first heat-type infrared sensing element section formed via a dielectric layer on a silicon substrate and having a void section formed thereunder, an output voltage thereof is changed in accordance with an amount of incident infrared rays; a bipolar transistor of which base voltage is an output voltage of said first heat-type infrared sensing element section; a second temperature sensing element section formed via a dielectric film on said silicon substrate, an output voltage thereof being utilized as an emitter voltage of said bipolar transistor; and an electric capacitor section connected to said bipolar transistor. The output of the second temperature sensing element section without a heat insulating structure depends on a temperature variation of the sensor itself. Accordingly, it is possible to correct the output of the first heat-type infrared sensing element section which is a true sensing section of infrared rays, whereby a high-efficient sensor with controlled noise can be obtained.

Also, in the aforementioned infrared sensor according to the second aspect of the invention, the first heat-type infrared sensing element section preferably comprises a first diode group including a plurality of junction diodes connected with each other, and the second temperature sensing element section preferably comprises a second diode group including a plurality of junction diodes connected with each other. This makes it possible to fabricate the infrared sensor together with a readout circuit of the sensor by means of a silicon IC process.

Also, in the aforementioned infrared sensor according to the second aspect of the invention, the first heat-type infrared sensing element section preferably comprises a first resistor, and the second temperature sensing element section preferably comprises a second resistor, so that a sensor having a high sensitivity can be obtained by using the resistor having a high temperature coefficient of resistance, thereby widening the scope of sensitivity setting.

According to the third aspect of the present invention, an infrared sensor array comprises a one-dimensional or two-dimensional array of the infrared sensors according to the aforementioned first or second invention, so that an output (image) with temperature correction for each sensor can be obtained, whereby a high-efficient infrared sensor array can be obtained.

According to the fourth aspect of the present invention, An infrared sensor array comprises: a one-dimensional or two-dimensional array of first heat-type infrared sensing element sections, each of which is formed via a dielectric layer on a silicon substrate and has a void section formed thereunder; a second temperature sensing element section and an electric capacitor disposed for each column of said array and formed via a dielectric layer on the silicon substrate; and MOSFETs disposed for each column of said array, the gate voltage of each MOSFET being an output of said first infrared sensing element section of the same column, the source voltage of each MOSFET being an output of said second temperature sensing element section of the same column; wherein a voltage of said electric capacitor, which is discharged by a voltage variation between the gate and the source of said MOSFET, is output as a reading-out signal. The construction of the infrared sensor array is simpler than the array having temperature-correcting sections for each sensor; an output (image) with temperature correction for each column can be easily obtained; and a highly efficient infrared sensor array can be obtained.

BRIEF DESCRIPTION OF THE DRAWINGS

FIGS. 2(a) and 2(b) show examples with different formations of a void section (heat insulating structure) under a diode group, and FIG. 2(c) shows an example in which a light shielding section is disposed above a diode group.

FIG. 8(a) shows an overall construction and FIG. 8(b) shows a construction for one sensor.

BEST MODES FOR CARRYING OUT THE INVENTION

Figure 1:
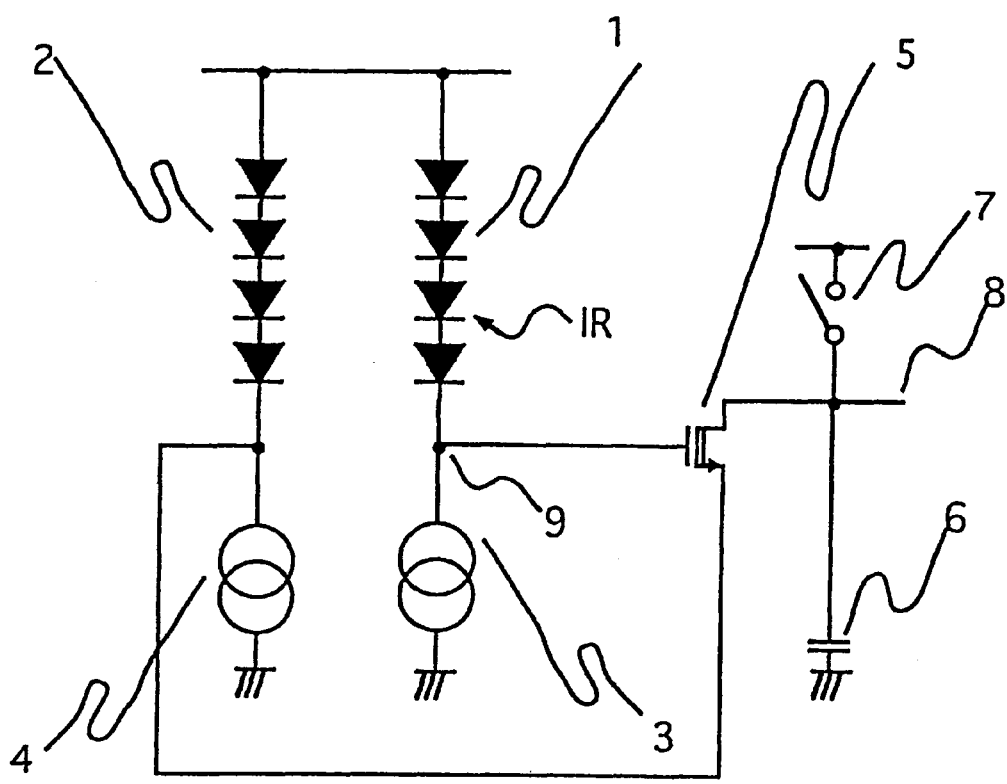
FIG. 1 is a circuit diagram for describing a construction of a heat-type infrared sensor using junction diodes according to a first embodiment of the present invention.

In an infrared sensor according to the first aspect of the invention, a first heat-type infrared sensing element section and a second temperature sensing element section are formed as a construction of one sensor. The first heat-type infrared sensing element section is located on a dielectric layer on a silicon substrate, and a void section is located under the infrared sensing element to construct a heat insulating structure. The second temperature sensing element section is located on a dielectric layer on the silicon substrate in the same manner, however, without a heat insulating structure. The second element section does not sense incident infrared rays but senses the temperature variation of the whole sensor. The output voltage of said first heat-type infrared sensing element section, which output is changed in accordance with the amount of incident infrared rays, is utilized as a gate voltage of a MOSFET. The output voltage of the second temperature sensing element section is utilized as a source voltage of the MOSFET. A gate/source voltage variation of the MOSFET is used as a signal with temperature correction. This signal is read out as a change in the amount of electric charge on the capacitor connected to the MOSFET. With this construction of the infrared sensor, it is possible to correct the output of the first heat-type infrared sensing element section, which is the true sensing section for infrared rays, whereby a highly efficient sensor with controlled noise can be obtained.

In the aforementioned infrared sensor, the first heat-type infrared sensing element section and the second temperature sensing element section may be constructed with a diode group having a plurality of junction diodes connected with each other, so that they can be fabricated together with the readout circuit of the sensor by means of a silicon IC process. Further, the number of diodes in the diode groups between the first sensing element section and the second sensing element section may be different, so that a MOSFET of enhancement type can be used.

In the infrared sensor according to the aforementioned first embodiment, a highly sensitive sensor can be easily obtained by constructing the first heat-type infrared sensing element section and the second temperature sending section with resistors and selecting those having a high temperature coefficient of resistance. Further, by allowing the resistors constituting the first and second sensing element sections to have the same resistance value, use of a MOSFET of depression type is made possible.

In an infrared sensor according to the second aspect of the invention, a first heat-type infrared sensing element section and a second temperature sensing element section are formed as a construction of one sensor. The first heat-type infrared sensing element section is formed via a dielectric layer on a silicon substrate, and a void section is formed under the infrared sensing element to construct a heat insulating structure. The second temperature sensing element section is formed via a dielectric layer on the silicon substrate in the same manner, however, without a heat insulating structure. The second element section does not have a function of sensing incident infrared rays but have a function of sensing the temperature variation of the whole sensor. The output voltage of said first heat-type infrared sensing element section, which output is changed in accordance with the amount of incident infrared rays, is utilized as a base voltage of a bipolar transistor. The output voltage of the second temperature sensing element section is utilized as an emitter voltage of the bipolar transistor. A base/emitter voltage variation of the bipolar transistor is used as a signal with temperature correction. This signal is read out as a change in the amount of electric discharge at the electric capacitor section connected to the bipolar transistor. With this construction of the infrared sensor, it is possible to correct the output of the first heat-type infrared sensing element section which is the true sensing section of infrared rays, whereby a high-efficient sensor with controlled noise can be obtained.

In this infrared sensor, the first heat-type infrared sensing element section and the second temperature sensing element section may be constructed with a diode group having a plurality of junction diodes connected with each other. This makes it possible to fabricate the infrared sensor together with the readout circuit of the sensor by means of a silicon IC process.

Alternatively, the first heat-type infrared sensing element section and the second temperature sensing element section may be constructed with resistors, so that, selecting the resistors having a high temperature coefficient of resistance, a highly sensitive sensor can be easily obtained.

In an infrared sensor array according to the third aspect of the invention, the infrared sensors according to the first or second embodiment are disposed in a one-dimensional or two-dimensional array, in which signals are sequentially read out by a vertical shift register and a horizontal shift register. An output (image) with temperature correction for each sensor can be obtained, whereby a highly efficient infrared sensor array can be obtained.

In an infrared sensor array according to the fourth aspect of the invention, first heat-type infrared sensing element sections are disposed in a one-dimensional or two-dimensional array. Each infrared sensing element section is formed via a dielectric layer on a silicon substrate and has a void section formed thereunder to construct a heat insulating structure. Second temperature sensing element sections, electric capacitors and MOSFETs are disposed for each column of the array. Each second temperature sensing element section is formed via a dielectric layer on the silicon substrate without a heat-insulating structure. An output voltage of the first infrared sensing element section of each of the column is utilized as a gate voltage of a MOSFET. An output voltage of the second temperature sensing element section of the same column is utilized as a source voltage of the MOSFET. A voltage of the electric capacitors discharged by a voltage variation between the gate and the source of said MOSFET is read out as an output signal. The second temperature sensing element section substantially does not sense the incident infrared rays but senses and outputs the temperature variation of each column or the whole array. The construction of the infrared sensor array of this embodiment is simpler than that having a temperature correcting section for each sensor. An output (image) with temperature correction for each column can be easily obtained, and a highly efficient infrared sensor array can be obtained.

Hereafter, embodiments of the present invention will be described with reference to the drawings.

Embodiment 1

FIG. 1 is a circuit diagram for describing a sensor of the first embodiment of the present invention. In the Figure, the numeral 1 represents an infrared light receiving section (light receiving element) composed of four junction diodes connected with each other. These diodes have a heat insulating structure, whereby an effective temperature rise is implemented by incident infrared rays. The numeral 2 represents a compensating section for compensating the influence of the temperature variation of the whole sensor to the output. The compensating section 2 is composed of four diodes connected with each other. Since the compensating section 2 does not have a heat insulating structure, the temperature hardly changes by the incident infrared rays. Both of the diode groups 1 and 2 are in a forward biased state, whereby a constant electric current flows by means of constant electric current sources 3 and 4. The voltage applied to the both ends of the diode varies in accordance with the temperature of the diode. Since the diode groups 1 and 2 are fabricated within the same sensor, the voltage variation width of each diode caused by the temperature change of the whole sensor is the same. Further, a MOSFET 5, an electric capacitor 6, a reset switch 7, and a signal output line 8 are shown. When infrared rays enter the light receiving section 1, the voltage at the node 9 increases, and the voltage between the gate and the source of the MOSFET 5 changes. The electric capacitor 6 charged beforehand through the reset switch 7 starts to discharge via the MOSFET 5. The amount of the discharged current changes in accordance with the voltage of the node 9, i.e. the amount of the incident infrared rays. As a result, after a certain period of time $t_{int}$ has passed from the start of the discharge, the voltage of the signal output line 8 changes in accordance with the amount of the incident infrared rays. The band of the signal output at this time is represented by $1/2t_{int}$, and the longer the period of the discharging time is, the more the band is limited to reduce the noise. The signal output voltage after a certain period of discharging time has passed can be adjusted to a desired value by suitably selecting the threshold voltage and the mutual conductance of the constant electric current source 3 and the capacitance value of the electric capacitor 6.

In this embodiment, when infrared rays enter, only the gate voltage of the MOSFET 5 changes. On the other hand, when the temperature of the whole sensor changes, the source voltage also changes in the same manner as the gate voltage, since the source voltage depends on the variation of the diode group 2 that varies in the same manner as the diode group 1. Thus, the voltage between the gate and the source does not change with the temperature change of the whole sensor. Therefore, the output variation caused by the temperature variation of the whole sensor can be effectively suppressed.

Figure 2A:
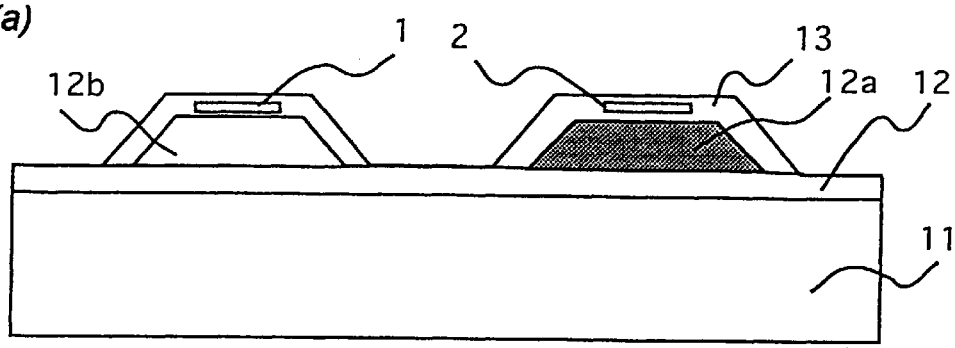
FIGS. 2(a)–2(c) are cross-sectional views of an essential portion of the sensor according to the first embodiment, where
Figure 2B:
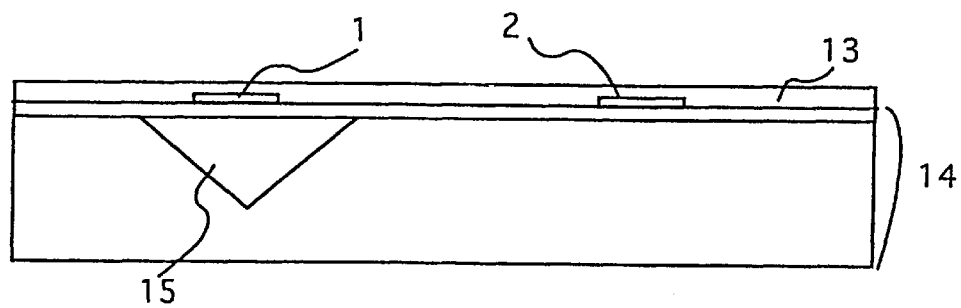
Figure 2C:
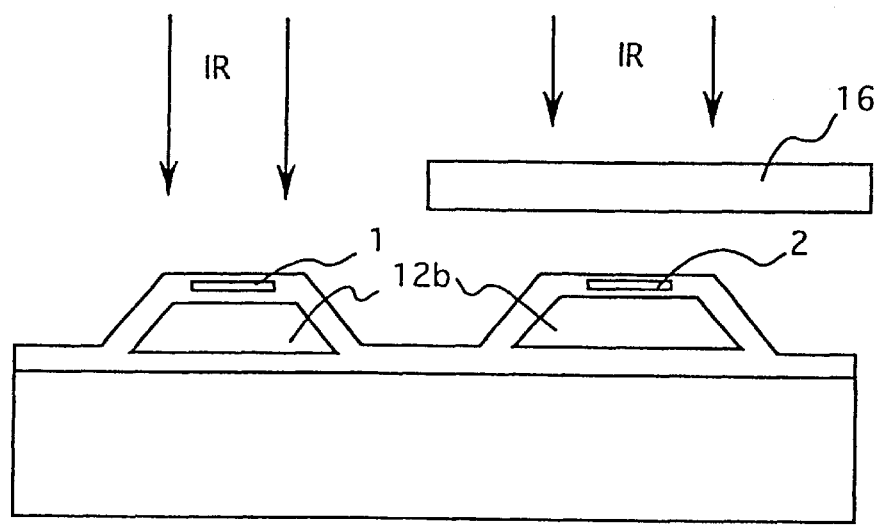

FIGS. 2(*a*)–2(*c*) are views showing a part of a cross-sectional structure of the infrared sensor according to embodiment 1 of the present invention. In FIG. 2(*a*) represents an example of a structure where a pedestal 12 made of, for example, polycrystalline silicon or amorphous silicon is formed on a silicon substrate 11, and a dielectric layer 13 made of, for example, $SiO_2$ or silicon nitride is formed to cover the pedestal 12. Diode groups 1 and 2, a wiring, and others (not illustrated) are fabricated together during this process. A hole (not illustrated) is formed in the dielectric layer on the diode group 1 to reach the pedestal. Via the hole, the pedestal under the diode group 1 is removed by means of an etching with, for instance, KOH to obtain a void section 12*b*. On the other hand, since the portion under the diode group 2 is not etched, a void that provides a heat insulating structure is not formed, and the pedestal portion 12*a* remains.

In FIG. 2(*b*) is an example of another structure, where an SOI (semiconductor on insulator) is used as a substrate. In an SOI substrate 14, a dielectric film made of $SiO_2$ is formed on a silicon substrate. Since the SOI itself has low noise, it is extremely effective for producing a highly efficient sensor. An example of a production process in the case of using the SOI substrate will be described. Diode groups 1 and 2, a wiring, and others (not illustrated) are formed on the SOI substrate 14, and further a dielectric film (protective film) 13 is formed to cover these. A resist for etching the surroundings of the diode group 1 is patterned, and dry etching is performed, whereby a hole is formed in the surroundings of the diode group 1. Further, the silicon substrate under the diode group 1 is etched via the hole to form a void section 15.

In FIG. 2(*c*) shows a infrared sensor with a light shielding 16 disposed above the diode group 2. In this case, the diode group 2 may have a heat insulating structure, i.e. a void section thereunder like the diode group 1 of (a), since the shielding section 16 removes the influence of the infrared rays. Alternatively, the diode group 2 may be formed without a heat insulating structure as in FIGS. 2(*a*) and 2(*b*). Although this is less sensitive as an infrared sensor, a light shielding section 16 further removes the influence thereof.

Embodiment 2

Figure 3:
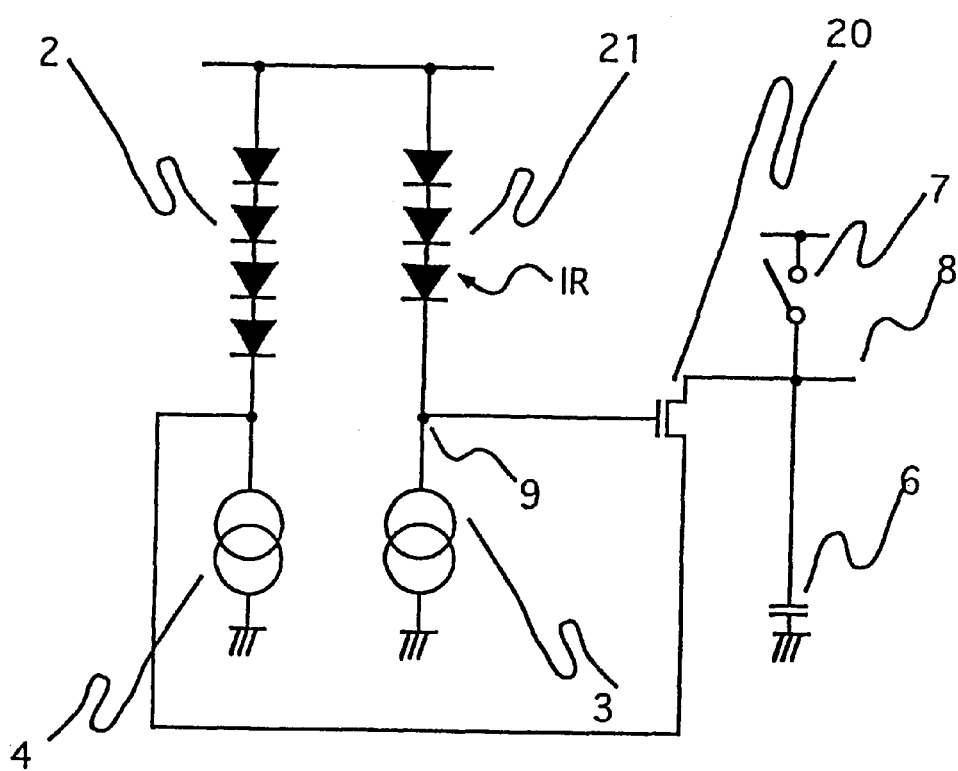
FIG. 3 is a circuit diagram for describing a construction of a heat-type infrared sensor using junction diodes according to a second embodiment of the present invention.

In embodiment 1, an infrared sensor using a MOSFET of depression type is described. However, a MOSFET of enhancement type can also be used. FIG. 3 is a sensor circuit diagram for describing a second embodiment of the present invention. In the Figure, the numeral 21 represents an infrared light receiving section including junction diodes, e.g. three junction diodes, connected with each other. Since the number of diodes in the diode group 21 is smaller by one than the number of diodes in the diode group 2, the voltage difference equivalent to one diode is generated between the source and the drain of the MOSFET 20. Therefore, electric discharge in the enhancement type is possible, whereby use of the enhancement type is made possible as the MOSFET 20.

In this embodiment, the individual junction diodes and the constant electric current sources 3, 4 are the same, and the number of diodes in the diode group 21 is made different by one from the number of diodes in the diode group 2. However, the difference in the number of diodes is not limited to one. Also, the magnitude of the junction area of the junction diode groups 1, 2 may be different each other; or the electric current values of the constant electric current sources 3, 4 may be adjusted to different value; so that the MOSFET 5 may be replaced with the MOSFET 20 of enhancement type Embodiment 3

Figure 4:
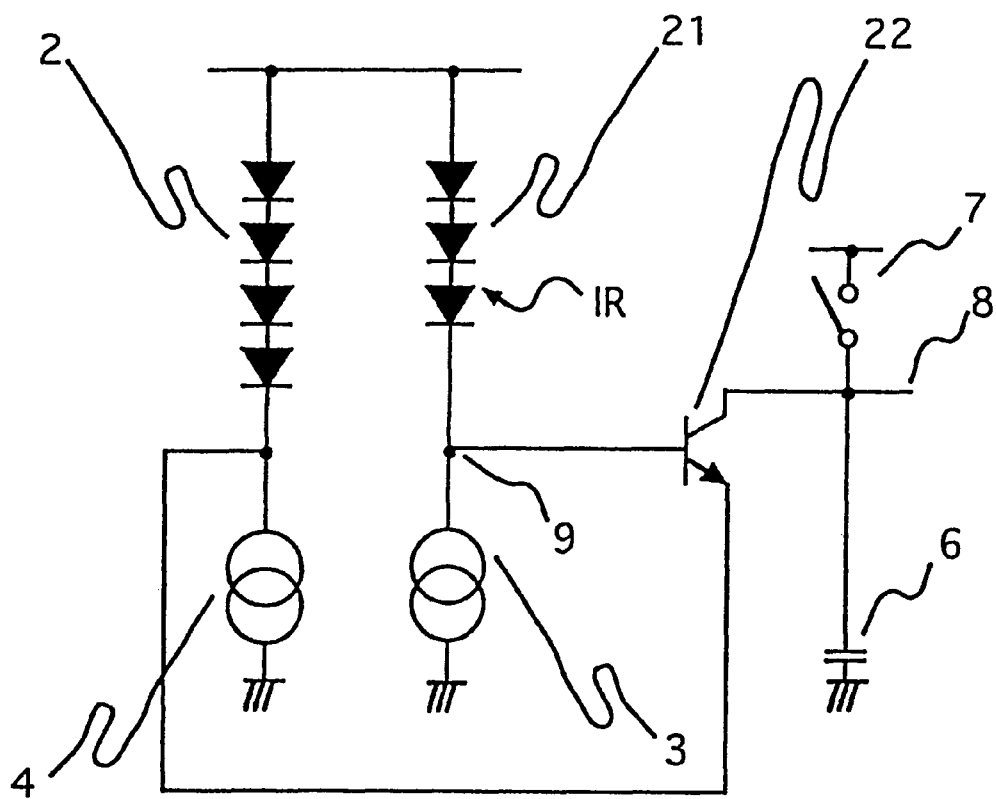
FIG. 4 is a circuit diagram for describing a construction of a heat-type infrared sensor using junction diodes according to a third embodiment of the present invention.

In embodiment 2, an infrared array with a MOSFET 20 of enhancement type is described. However, a bipolar transistor 12 may also be used. FIG. 4 is a circuit diagram of a sensor showing the third embodiment of the present invention. In FIG. 4, a bipolar transistor 22 is used instead of the MOSFET for integration. This construction is advantageous particularly in the case where diodes are used as the sensor. The junction diodes in the light receiving section 21 are composed of three junction diodes connected with each other as in embodiment 2. These diodes have a heat insulating structure, whereby an effective temperature rise is implemented by incident infrared rays. The numeral 2 represents four junction diodes connected with each other. Since these diodes do not have a heat insulating structure, the temperature hardly changes even if the infrared rays enter.

In the first embodiment, when the temperature of the whole sensor varies, the voltages of the gate and the source move simultaneously so that influence of the temperature change in the sensor is almost compensated. However, the electric current value of the MOSFET 5 varies in accordance with the temperature. Therefore, there will be a slight influence caused by the temperature variation of the sensor.

On the other hand, since a bipolar transistor is used in this embodiment as shown in FIG. 4, the voltage between the emitter and the base, which is caused by the difference in the number of connected diodes, changes with temperature fluctuation and compensates for the characteristic change of the bipolar transistor. Therefore, there will be no signal output change caused by the temperature fluctuation.

Embodiment 4

In embodiments 1 to 3, heat-type infrared sensors using junction diodes in a light receiving section are described. Here, an infrared sensor with a bolometer as a temperature sensing material of the light receiving section will be described.

Figure 5:
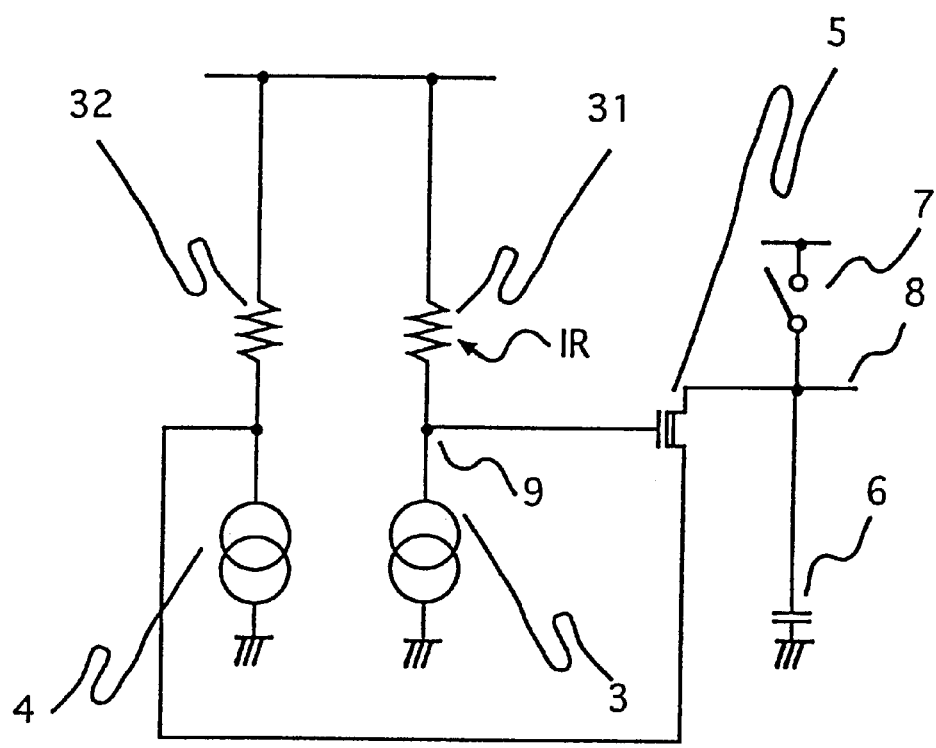
FIG. 5 is a circuit diagram for describing a construction of a heat-type infrared sensor using resistors according to a fourth embodiment of the present invention.

FIG. 5 is a circuit diagram for describing a sensor of this embodiment of the invention. In FIG. 5, the numeral 31 represents an infrared light receiving section (light receiving element) which is made of a resistor having a heat insulating structure, whereby an effective temperature rise is implemented by the incident infrared rays. The numeral 32 represents a compensating section, which is a resistor made of the same material as the resistor 31. The compensating section 32 suppresses the influence on the output by the temperature variation of the whole sensor. Since the resistor 32 does not have a heat insulating structure, the temperature hardly changes even if the infrared rays enter. The operation principle is the same as the sensor in embodiment 1. A constant electric current flows through each of the resistors 31 and 32 by constant electric current sources 3 and 4. The voltage applied between two ends of the resistor varies in accordance with the temperature of the resistor. Since the resistors 31 and 32 are fabricated together in the same sensor, when the temperature of the whole sensor varies, the voltage variation width of each resistor caused by that temperature variation will be the same. When the infrared rays enter in the resistor 31, the voltage of the node 9 changes, and the voltage between the gate and the source of the MOSFET 5 changes. The electric capacitor 6 charged beforehand through the reset switch 7 starts to discharge via the MOSFET 5. The amount of discharged current changes in accordance with the voltage of the node 9, i.e. the amount of the incident infrared rays. As a result, after a certain period of time $t_{int}$ has passed from the start of the discharge, the voltage of the signal output line 8 changes in accordance with the amount of the incident infrared rays. The band of the signal output at this time is represented by $1/2t_{int}$, and the longer the period of the discharging time is, the more the band is limited to reduce the noise. The signal output voltage after a certain period of discharging time can be adjusted to a desired value by suitably selecting the threshold voltage, the mutual conductance of the constant electric current source 3 and the capacitance value of the electric capacitor 6.

In this embodiment, when infrared rays enter, only the gate voltage of the MOSFET 5 changes. On the other hand, when the temperature of the whole sensor changes, the source voltage also changes in the same manner as the gate voltage, since the source voltage depends on the variation of the resister 32 that varies in the same manner as the resister 31. Thus, the voltage between the gate and the source does not change with the temperature change of the whole sensor. Therefore, the output variation caused by the temperature variation of the whole sensor can be effectively suppressed.

As described above, using the bolometer type, the output variation caused by the sensor temperature variation can be suppressed in the same manner as in the junction diode type of embodiment 1.

Embodiment 5

Figure 6:
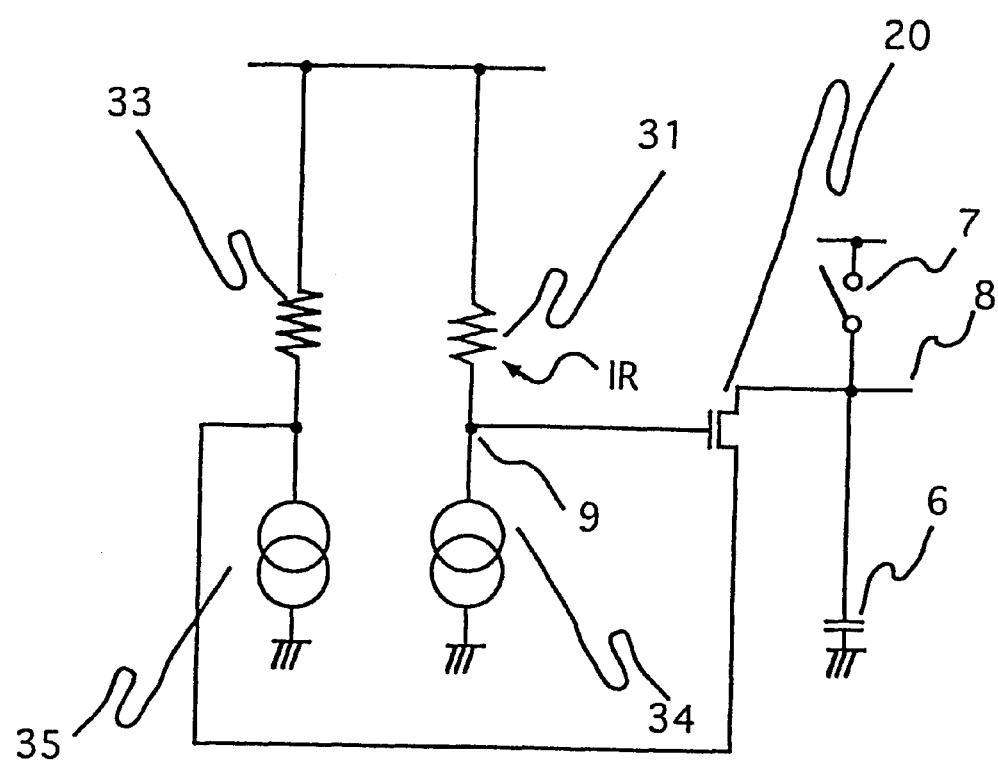
FIG. 6 is a circuit for diagram for describing a construction of a heat-type infrared sensor using resistors according to a fifth embodiment of the present invention.

In embodiment 4, an infrared sensor using a MOSFET of depression type as the MOSFET 5 is described. However, a MOSFET of enhancement type can also be used. FIG. 6 is a circuit diagram for describing a sensor of this embodiment of the invention. In FIG. 5, the numeral 31 represents an infrared light receiving section made of a resistor 31. The numeral 33 represents a resistor having a resistor value, i.e. length or width, different from the resistor 31. The numeral 20 represents a MOSFET of enhancement type. In this embodiment, the voltage between the gate and the source of the MOSFET 20 for integration is adjusted by the ratio of the length or the width of the resistors 31 and 32. Alternatively, allowing the resistor 31 and the resistor 33 to be the same, the voltage between the gate and the source of the MOSFET 20 can be adjusted by changing the electric current values of the constant electric current sources 34, 35. These make it possible to discharge the electric capacitor 6 with the MOSFET 20 of enhancement type, whereby the same effect as in embodiment 4 can be obtained. The output variation caused by the temperature variation of the sensor can be effectively suppressed.

Embodiment 6

Figure 7:
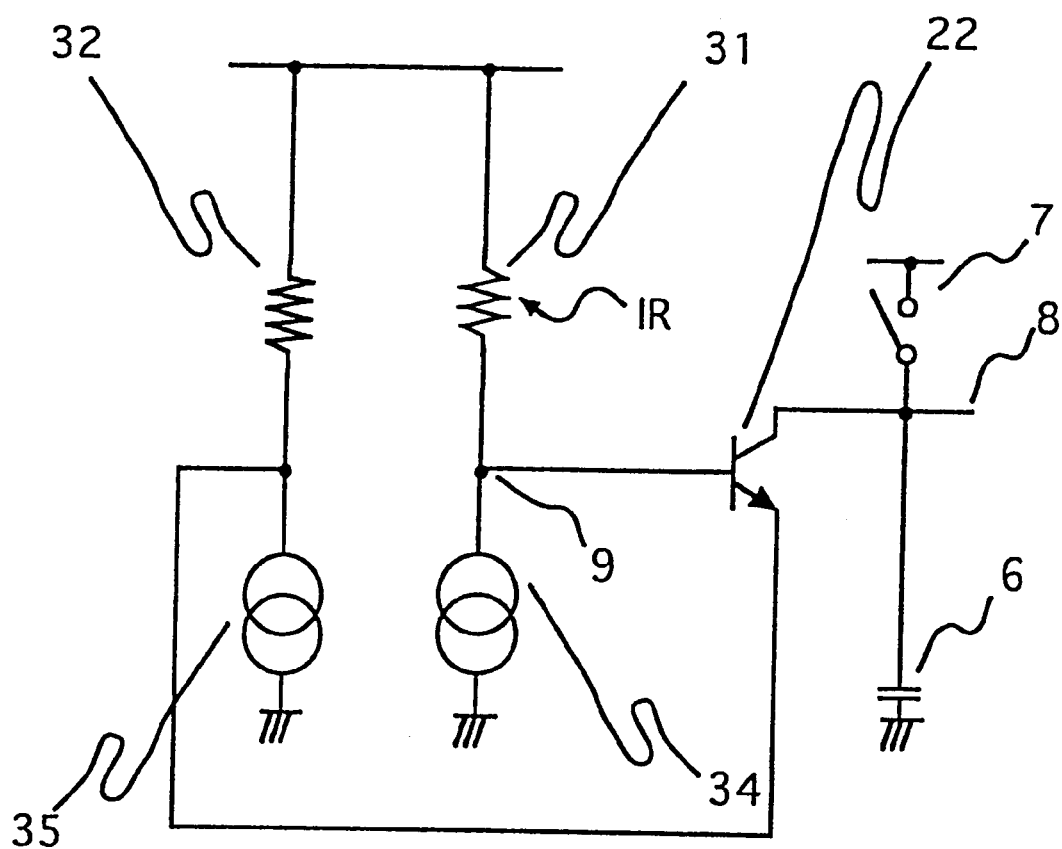
FIG. 7 is a circuit diagram for describing a construction of a heat-type infrared sensor using resistors according to a sixth embodiment of the present invention.

It goes without saying that, as well as in embodiment 3 of the junction diode type, the transistor for integration can be changed to the bipolar transistor 12 in the bolometer-type sensor using a resistor. The circuit diagram of such a sensor is shown in FIG. 7.

In the aforementioned embodiments 2 to 6, the sensor is produced in almost the same manner as the production steps explained with FIG. 2 in embodiment 1.

Also, although the discharge operation of the electric capacitor is utilized in the aforementioned embodiments 1 to 6, the same effect can be obtained by utilizing a charge operation of the electric capacitor.

Embodiment 7

Infrared sensors of the aforementioned embodiments 1 to 6, in which an outputs change caused by a temperature fluctuation is suppressed, can be arranged in a one-dimensional or two-dimensional array to construct an infrared solid image sensor.

Figure 8A:
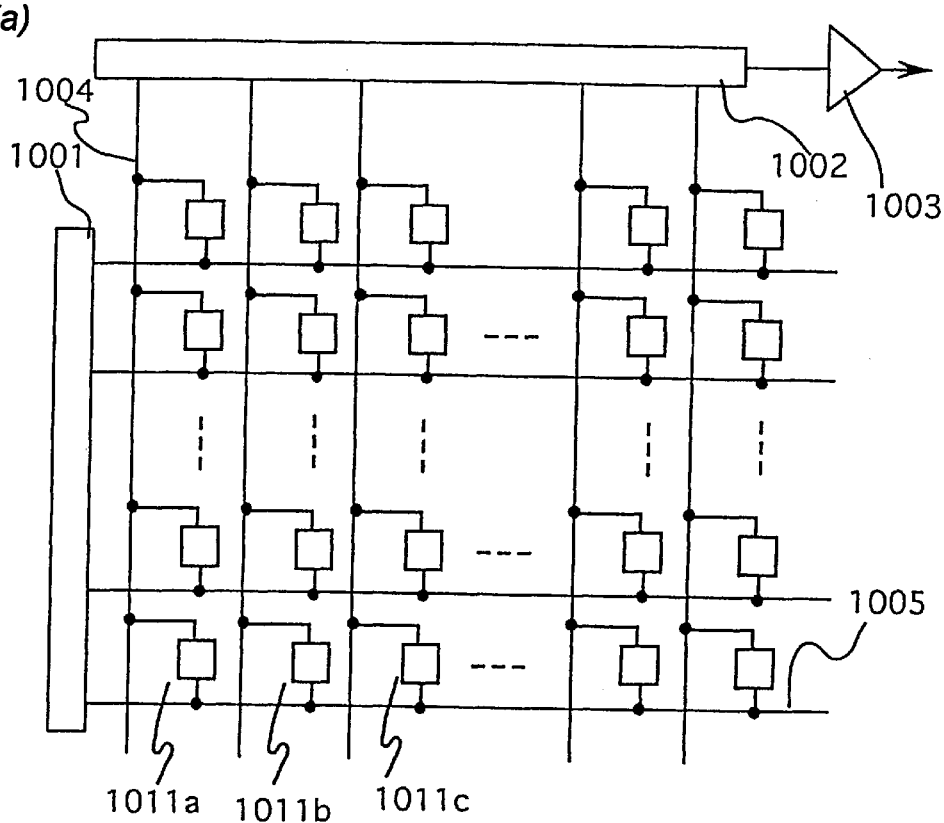
FIGS. 8(a) and 8(b) show a construction of an infrared sensor array according to a seventh embodiment of the present invention, where
Figure 8B:
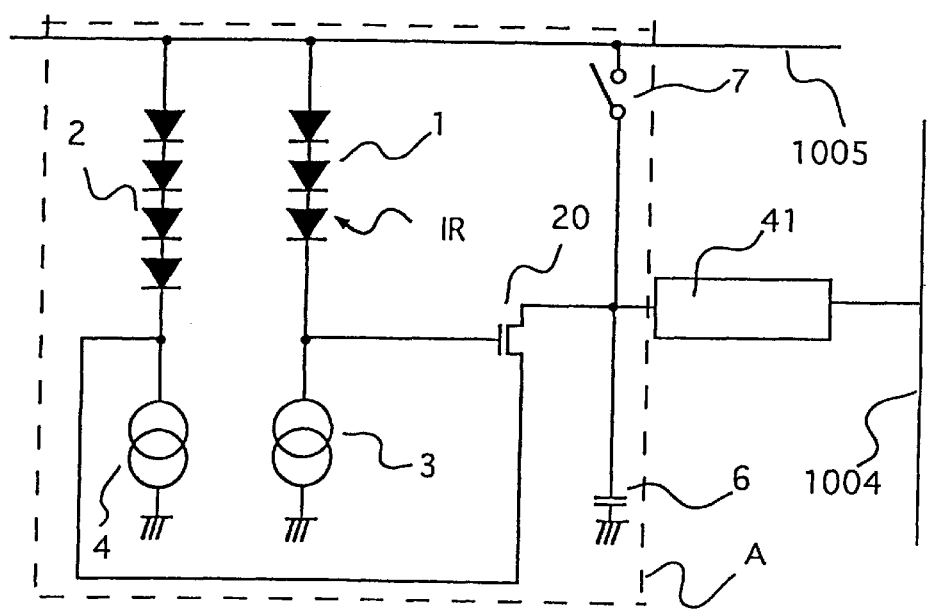

FIGS. 8(*a*) and 8(*b*) show an infrared-sensors array of embodiment 7 of the present invention, in which an two-dimensional array of sensors are constructed. In FIG. 8(*a*), sensors 1011*a*, 1011*b* . . . are arranged in a two-dimensional matrix. Each sensor in a column is connected to a vertical signal line 1004, which is connected to a horizontal shift register 1002. Each sensor in a row is connected to a horizontal signal line 1005, which is connected to a vertical shift register 1001. The numeral 1003 represents a buffer. The construction of each sensor is shown in FIG. 8(*b*). The essential portion A of the sensor is made, for example, of a sensor described in embodiment 2 (FIG. 3), and a signal output is read out via a sample hold 41 to the horizontal signal line 1004.

One row of the sensor matrix is selected by the vertical shift register 1001. In the sensor of the selected row, the electric capacitor 6 has already been charged and the reset switch 7 is open. Thus, an output with corrected value for temperature variation of the whole sensor is read out to the sample hold 41 as a change of the electric resistance 6.

During the selection period of one row by the vertical shift register 1001, each column is sequentially selected by the horizontal shift register 1002, and the output signal of the selected row and column is sequentially read out from the sample hold 41. The read-out output signal is output via the buffer to the outside.

Each sensor corresponding to a pixel can output a signal of which variation caused by the change of the sensor temperature is corrected and of which noise is suppressed. Accordingly, the above-mentioned construction can provide a highly efficient infrared sensor array.

In this embodiment, an example in which the sensor portion A is the one described in embodiment 2. However, it goes without saying that similar effects are achieved with those described in other embodiments 1, 3, 4 and 5.

Also, although this embodiment has been described with reference to those arranged in a two-dimensional array, they may be arranged in a one-dimensional array.

Embodiment 8

In embodiment 7, a circuit for temperature correction of the sensor (pixel) is provided for each pixel. However, in the case they are arranged in an array, the circuit for temperature correction may be provided for each column of the array. In this case, since the temperature correction is performed column by column, the precision of the correction is inferior to that of embodiment 7. However, the layout is easier and the fabrication steps are simpler than embodiment 7.

Figure 9:
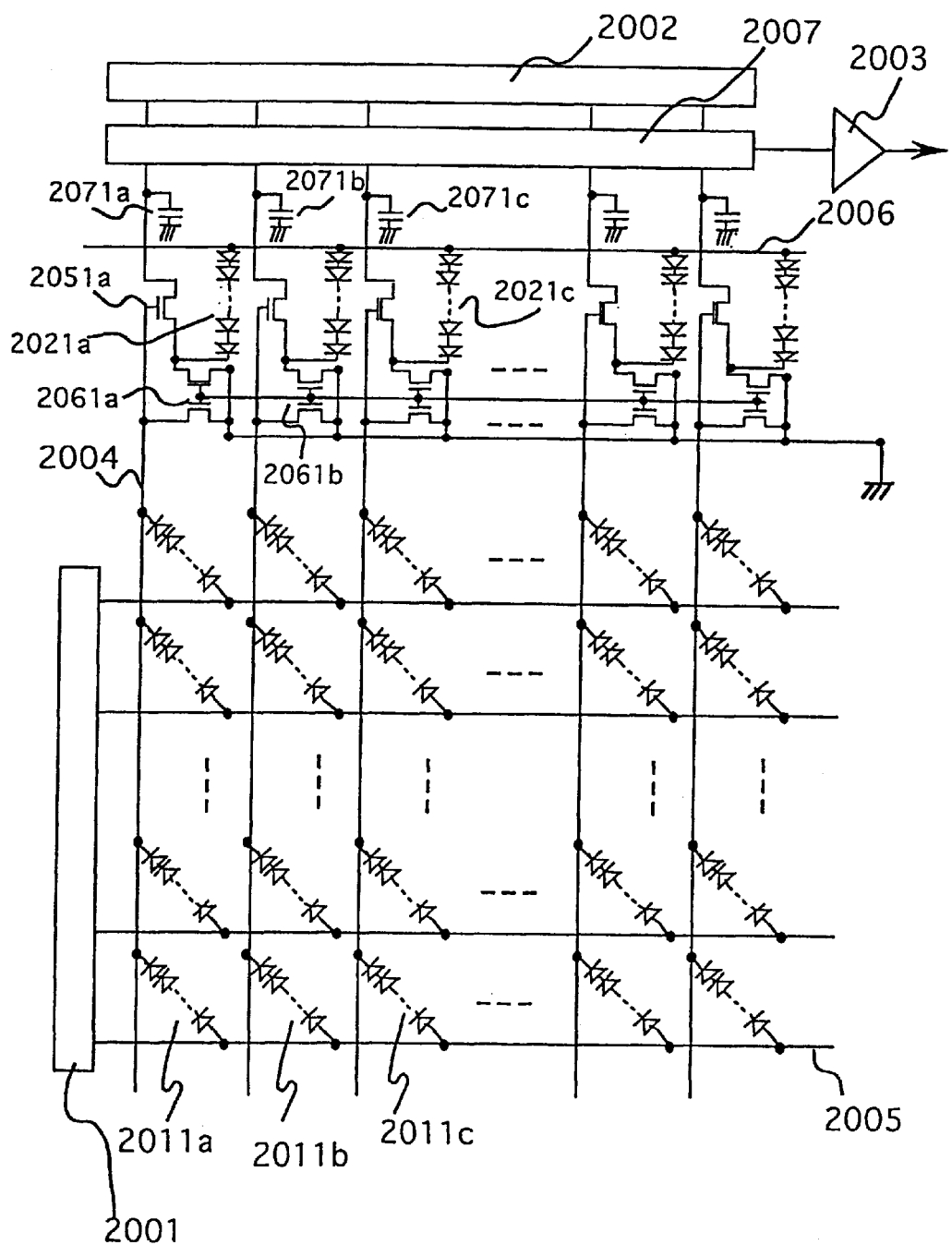
FIG. 9 is a diagram for describing a construction of an infrared sensor array according to an eighth embodiment of the present invention.
Figure 10:
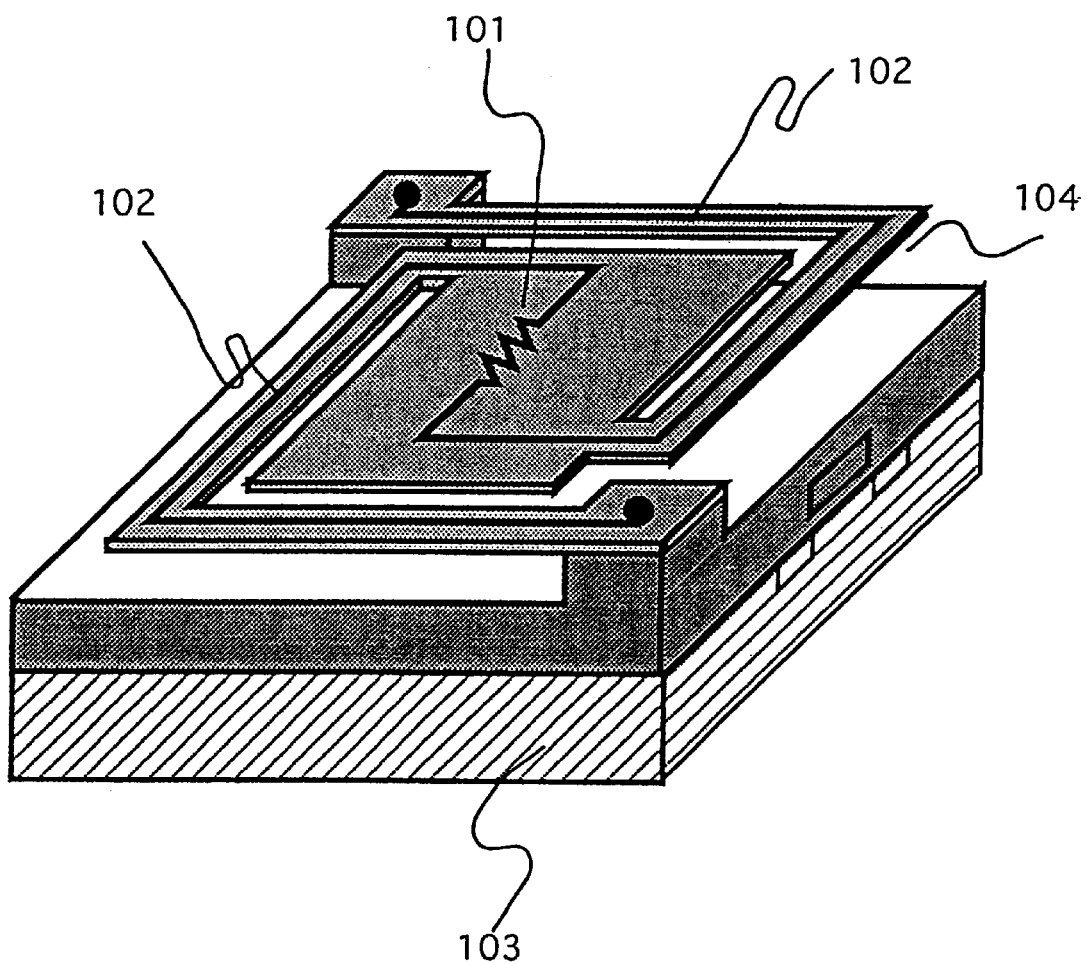
FIG. 10 is a perspective view for describing a structure of a conventional heat-type infrared sensor using a bolometer.
Figure 11:
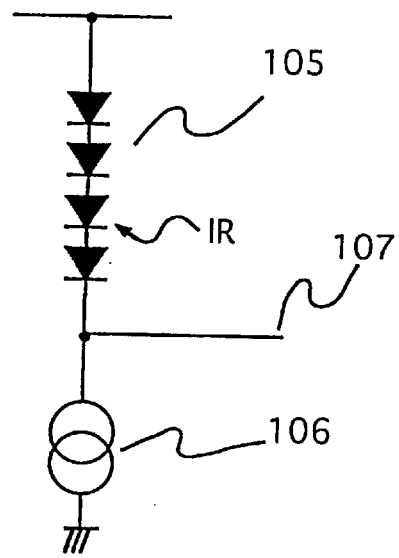
FIG. 11 is a circuit diagram for describing a construction of a conventional heat-type infrared sensor using junction diodes.
Figure 12:
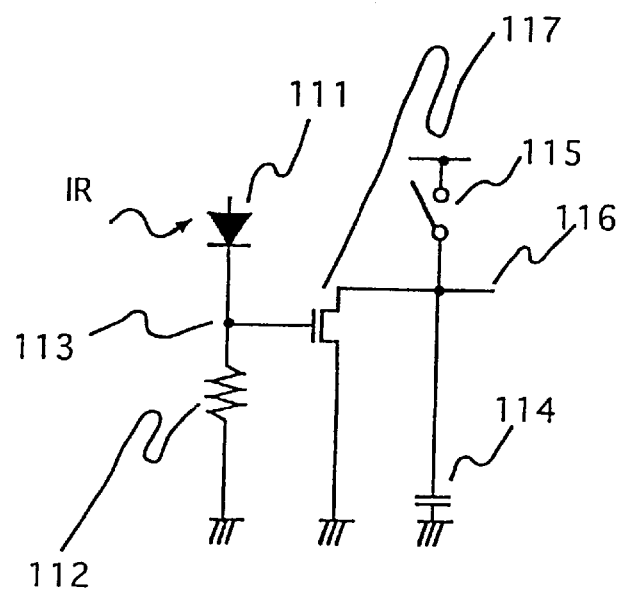
FIG. 12 is a circuit diagram for describing a conventional quantum-type infrared sensor, where an integration circuit is provided for limiting a signal band.

FIG. 9 shows embodiment 8 of the present invention, in which an array of sensors arranged in a two-dimensional manner is constructed. In FIG. 9, the numerals 2011a, 2011b . . . represent infrared sensors made of a plurality of junction diodes connected with each other, and a signal in the forward direction of the sensor enters a gate of a MOSFET 2051 for integration via a vertical signal line 2004. The other end of the sensor is connected to a horizontal signal line 2005 which is linked with a vertical shift register 2001. The numerals 2021a, 2021b . . . represent temperature correction sections of the sensors of each column, which are made of a plurality of junction diodes connected with each other like the sensors 2011a, 2011b . . . The numerals 2061a, 2061b . . . represent constant electric current sources for the sensors 2011a . . . and the temperature correction sections 2021a . . . The numerals 2071a, 2071b . . . represent electric capacitors for electric discharge. Also, a horizontal shift register 2002, a buffer 2003, and a sample hold 2007 are shown.

Next, the operation will be described. After the electric capacitors 2071 . . . for electric discharge are charged to a certain voltage, one row is selected by the vertical shift register 2001. An electric current flows through the sensors 2011 . . . , whereby a predetermined voltage is generated between the gate and the source of the MOSFET 2051 . . . for integration, and the electric discharge from the electric capacitors 2071 . . . starts. When the selection of the vertical shift register 2001 is released, the electric discharge from the electric capacitors 2071 . . . stops, and the voltages of the electric capacitors 2071 . . . are sequentially read out by means of the horizontal shift register 2002. Then, by sequentially selecting the rows by means of the vertical shift register 2001 and repeating the same operation, the signals of the sensors corresponding to all the pixels can be read out. The read-out signals are output via the sample hold 2007 and the buffer 2003 to the outside.

Since each column has a temperature correction circuit, the output signal from the sensors corresponding to each pixel is corrected column by column for their variation caused by the temperature change of the sensor. Further, noise of the output signal is suppressed. Therefore, the above-mentioned construction can provide a highly efficient infrared sensor array.

In this embodiment, a plurality of junction diodes connected with each other are used as the sensors 2011a . . . and the temperature correction sections 2061a . . . , and MOSFETs 2051a . . . are used for integration. However, the same effect will be achieved by applying the construction of embodiments 1 to 6 or combination thereof. For example, a combination as follows may be adopted as well; junction diodes different in number or resistors having different resistance values are used as the sensors 2011a . . . and the temperature correction sections 2061a, and bipolar transistors are used as the elements 2051a. . . .

Also, although this embodiment has been described the array in which sensors are arranged in a two-dimensional array, they may be arranged in one-dimensional.

Industrial Applicability

The infrared sensor and the sensor array according to the present invention are utilized in a dark field observation camera and others.

What is claimed is:

1. An infrared sensor comprising:
   a first infrared sensing element located on a first dielectric layer that is disposed on a silicon substrate, the first dielectric layer having a void opposite said first infrared sensing element, said first infrared sensing element producing a first output voltage depending on incident infrared rays;
   a MOSFET having a gate receiving the first output voltage, a source, and a drain;
   a second temperature sensing element located on a second dielectric film that is disposed on said silicon substrate, the second temperature sensing element producing a second output voltage received by the source of said MOSFET; and
   a capacitor section connected to the drain of said MOSFET.

2. The infrared sensor according to claim 1, wherein said first infrared sensing element comprises a first diode group including a plurality of junction diodes connected with each other and said second temperature sensing element comprises a second diode group including a plurality of junction diodes connected with each other.

3. The infrared sensor according to claim 2, wherein different numbers of diodes are included in said first and second diode groups.

4. The infrared sensor according to clam 1, wherein said first infrared sensing element comprises a first resistor and said second temperature sensing element comprises a second resistor.

5. The infrared sensor according to claim 4, wherein said first resistor and said second resistor have the same resistance.

6. An infrared sensor array comprising an at least one-dimensional array of said infrared sensors of claim 1.

7. The infrared sensor according to claim 1, wherein said first and second dielectric layers are a single film.

8. An infrared sensor comprising:
   a first infrared sensing element located on a first dielectric layer that is disposed on a silicon substrate, the first dielectric layer having a void opposite said first infrared sensing element, said first infrared sensing element producing a first output voltage changing in response to incident infrared rays;
   a bipolar transistor having a base receiving the first output voltage, an emitter, and a collector;
   a second temperature sensing element located on a second dielectric film that is disposed on said silicon substrate, the second temperature sensing element producing a second output voltage connected to the emitter of said bipolar transistor; and a capacitor section connected to the collector of said bipolar transistor.

9. The infrared sensor according to claim 8, wherein said first infrared sensing element comprises a first diode group including a plurality of junction diodes connected with each other and said second temperature sensing element comprises a second diode group including a plurality of junction diodes connected with each other.

10. The infrared sensor according to claim 8, wherein said first infrared sensing element comprises a first resistor and said second temperature sensing element comprises a second resistor.

11. An infrared sensor array comprising an at least one-dimensional array of said infrared sensors of claim 8.

12. The infrared sensor according to claim 8, wherein said first and second dielectric layers are a single film.

13. An infrared sensor array comprising:

an at least one-dimensional array of first infrared sensing elements, each first infrared sensing element being located on a first dielectric layer that is disposed on a silicon substrate, the first dielectric layer having a void opposite each of said first infrared sensing elements, said first infrared sensing elements being arranged in columns and producing respective first output voltages;

a respective second temperature sensing element producing a second output voltage and a capacitor for each column of said array, located on a second dielectric layer on said silicon substrate; and respective MOSFETs for each column of said array having gates receiving first output voltages of said first infrared sensing elements of a corresponding column, sources receiving the second output voltages of said second temperature sensing element corresponding to the column, and drains connected to said capacitor corresponding to the column, wherein a voltage of said capacitor, which is discharged by a voltage variation between the gate and the source of said MOSFET of the corresponding column, is output as a read-out signal.

* * * * *